Aug. 27, 1968 W. J. FAULKNER 3,398,962

SPEED CHANGER FOR A PHONOGRAPH RECORD PLAYER

Original Filed Feb. 24, 1964 3 Sheets-Sheet 1

INVENTOR.
WILLARD J. FAULKNER
BY J. E. Douglas
His ATTORNEY

SPEED CHANGER FOR A PHONOGRAPH RECORD PLAYER
Original Filed Feb. 24, 1964
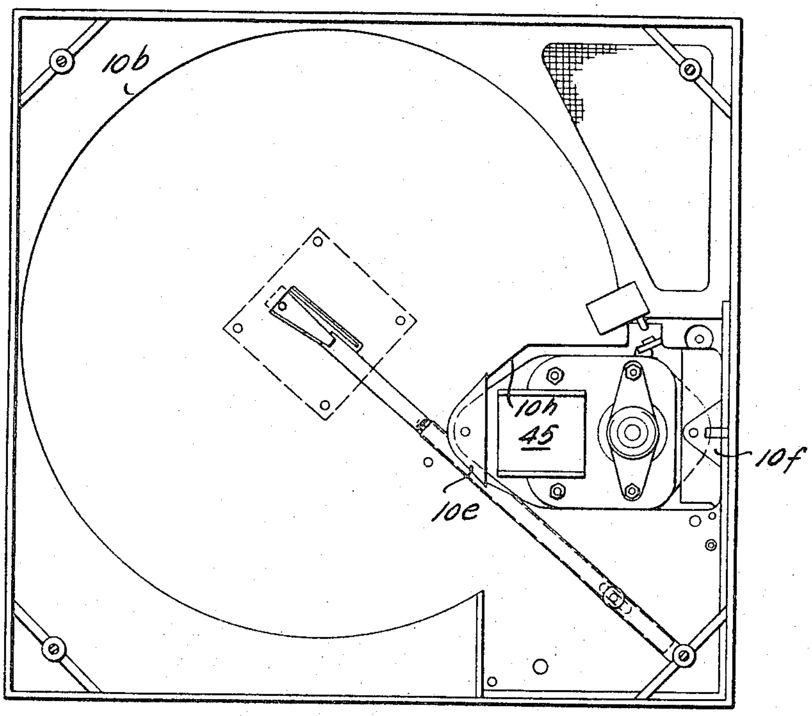
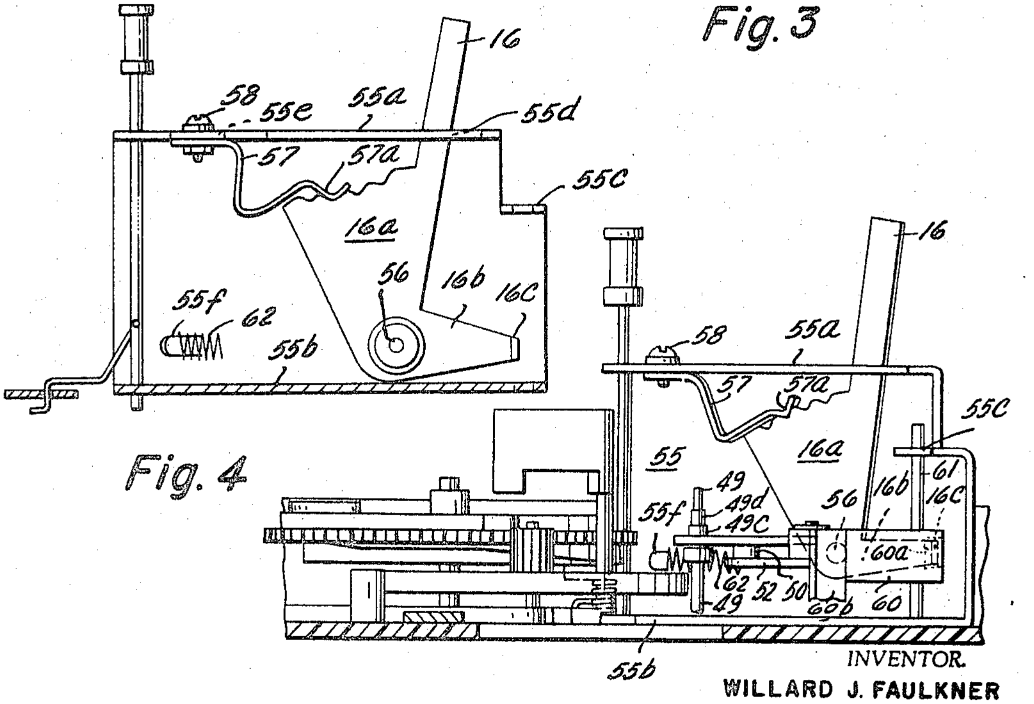
Fig. 3, Fig. 4, Fig. 5
INVENTOR.
WILLARD J. FAULKNER
BY
J. D. Douglas
His ATTORNEY

SPEED CHANGER FOR A PHONOGRAPH RECORD PLAYER

Original Filed Feb. 24, 1964 3 Sheets-Sheet 3

INVENTOR.
WILLARD J. FAULKNER
BY
J. W. Douglas
His ATTORNEY

United States Patent Office 3,398,962
Patented Aug. 27, 1968

3,398,962

SPEED CHANGER FOR A PHONOGRAPH RECORD PLAYER

Willard J. Faulkner, Glen Ellen, Ill., assignor to Karl W. Jensen, La Grange, Ill.

Original application Feb. 24, 1964, Ser. No. 346,602, now Patent No. 3,304,092, dated Feb. 14, 1967. Divided and this application Dec. 20, 1966, Ser. No. 627,568
5 Claims. (Cl. 274—9)

ABSTRACT OF THE DISCLOSURE

A multiple speed drive for a record player turntable wherein a motor is resiliently mounted on a base below the turntable and has a motor shaft extending upward through the base beside the turntable with a plurality of different diameter portions. An idler wheel having a wide flexible rim is disposed between the motor shaft and the turntable rim and is moveable upward or downward relative to the motor shaft. The flexible rim bends readily so that idler does not have to be moved away from the turntable and shaft when shifting speeds. The support means for the idler includes a level which extends above the base with adjustable detent means for holding the idler in the desired position.

This invention relates to phonograph record changers and more particularly to one upon which records of different sizes may be manipulated. This application is a division of application Ser No. 346,602, filed Feb. 24, 1964, now Patent No. 3,304,092.

More particularly it relates to a changer where the records are stacked on a center post having a shoulder upon which the records rest, and which are moved off of the center post one at a time to fall on the turntable where they are played. A stabilizer or hold down arm engages the top record of the stack and keeps them from falling off prematurely.

During each change cycle the tone arm is lifted off of the played record, moved out to one side of the stack and returned to contact the record on the bottom of the stack, to determine the size of record, then moved outward to allow the record to be dropped and then returned to playing position and lowered onto the record just dropped.

Still other advantages of the invention and the invention itself will become more apparent from the following description of an embodiment thereof, which is illustrated by the accompanying drawings and forms a part of this specification.

In the drawings:

FIG. 3 is a bottom plan view of the record changer;

FIG. 4 is a side elevational view of the speed shift lever control means and record ejector and the support therefor;

FIG. 5 is a view taken from the line 5—5 of FIG. 6 illustrating the speed shift, turntable drive and record change cycle mechanism;

Figures 1, 2:
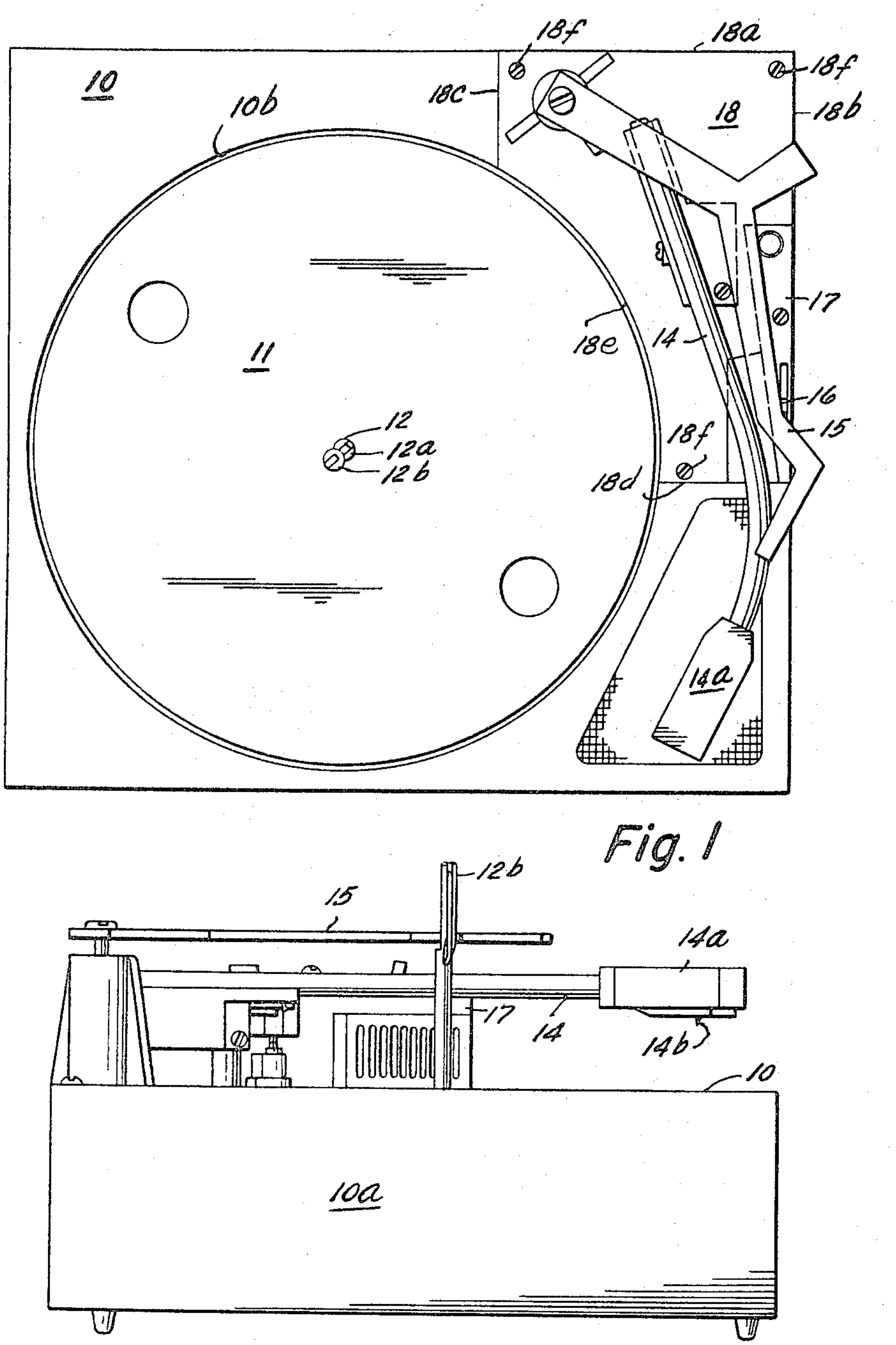
FIG. 1 is a plan view of a record changer of this invention, with the mechanism in an "off" position.
FIG. 2 is a side elevational view of the record changer of FIG. 1.

Referring now to the drawings, throughout which like parts have been designated by like reference characters, and more particularly as can best be seen from FIGS. 1 to 3 inclusive, exteriorly the changer is depicted as including a base having an upper surface 10 and downwardly extending side walls 10*a*. The upper side is provided with a downwardly extending circular well 10*b* in which a turntable 11 is disposed. A spindle 12 extends upwardly from the center of the turntable, and has the usual offset record stack holding part 12*b* and a record supporting shoulder 12*a*.

On the top of the base and to one side of the turntable, there is provided a removable cover plate housing 18, the adjacent edges 18*a*–18*b* of which define the upper right corner and the edges 18*c* and 18*d* the two extremities and which extremities are joined together by a curved edge 18*c* which follows the contour of the turntable 11. The base is held in position by screws 18*f* which extend through the plate and are threaded into bosses, not shown, on the side walls 10*a*. A tone arm 14 and adjacent thereto a record stabilizer and hold down arm 15 are swingably mounted on the plate 18. The tone arm is provided with the usual pickup head 14*a* having a needle 14*b* for tracking the record groove.

At the extreme edge of the base plate 18 is the motor speed control lever 16, which extends upward through a housing 17 extending vertically upward from the base of the plate.

As previously stated, the extreme right edge of the plate 18 has an upwardly extending housing through which the speed control lever 16 extends.

Figure 6:
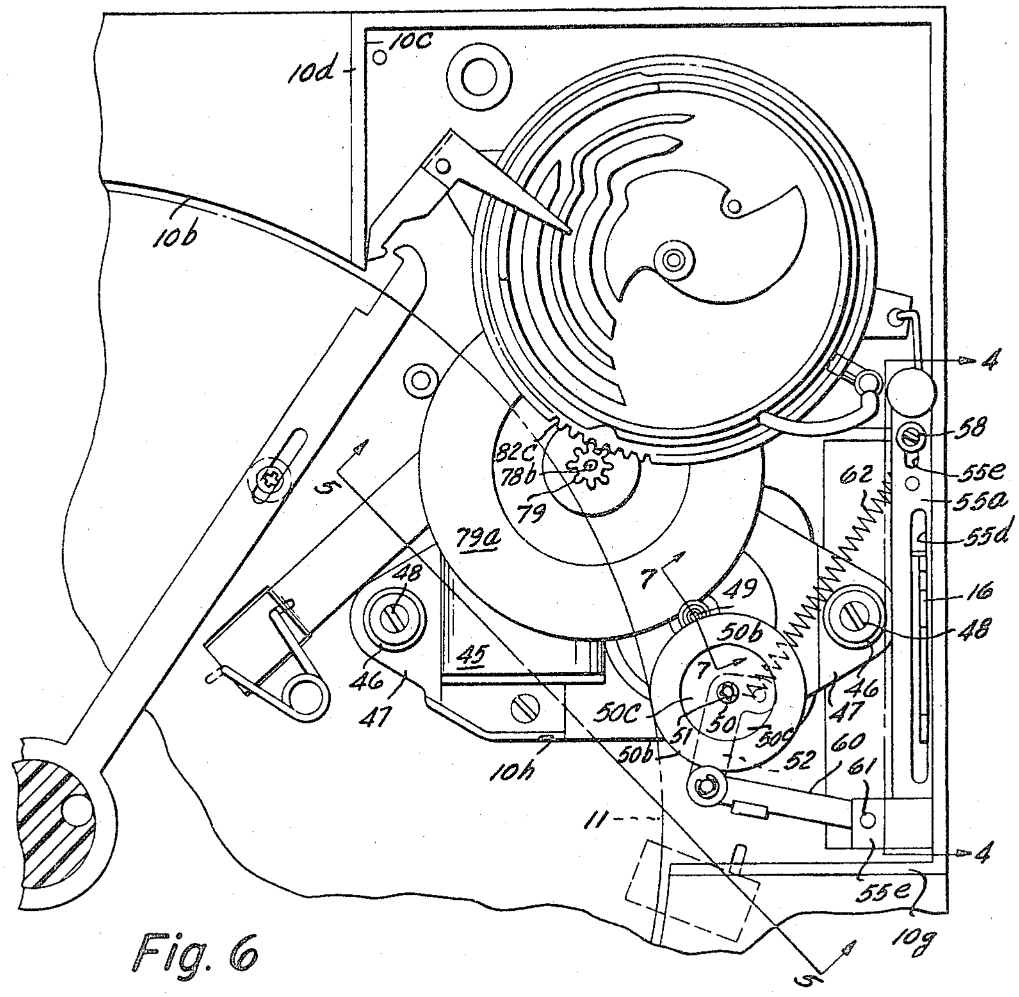
FIG. 6 is an enlarged fragmentary plan view of the cycling mechanism, the turntable, showing the motor and drive means, the support plate having been removed.
Figure 7:
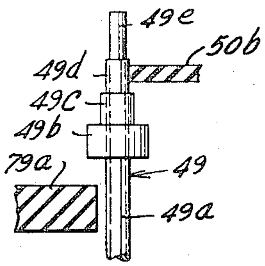
FIG. 7 is a fragmentary section taken on the line 7—7 of FIG. 6 and showing the motor shaft and idler wheels.

As can best be seen from FIG. 6, the circular well 10*b* in which the turntable is disposed connects or intersects with a rectangular well 10*c* which has peripheral ledges 10*d* and 10*g* upon which the respective edges 18*c* and 18*d* of the plate 18 rest. The two adjacent edges 18*a* and 18*b* rest on top of the side walls which meet to form the upper righthand corner.

The bottoms of the wells 10*b* and 10*c* are coextensive. As best shown in FIG. 3, the bottom is provided with a motor aperture 10*h* having supports 10*e* and 10*f*, at opposite ends on which a motor 45 is resiliently mounted.

It should be noted that this mounting is highly resilient due to the fact that the motor is suspended on resilient grommets 46 disposed in the motor brackets 47 (FIG. 6) with screws 48 extending through the grommets and threaded into the supports 10*e* and 10*f*. The motor may therefore tilt in the grommets which allows the motor shaft 49 to tilt.

The motor shaft is a stepped shaft arranged to drive the turntable at speeds of 16; 33⅓; 45 and 78 r.p.m. To this end the motor shaft is provided with a first cylindrical surface 49*a* which is used to drive the cycle changing mechanism and spaced above this is a large surface 49*b* for providing the 78 r.p.m. speed (this is actually 78.26 r.p.m.) and upwardly therefrom surfaces 49*c*, 49*d* and 49*e* for providing the speed of 78; 45; 33⅓ and 16 r.p.m. respectively.

The drive to the turntable is effected by a flexible idler wheel which engages with the steps of the motor shaft and with the periphery of the turntable 11, FIG. 6. The idler wheel includes a hub 50 which is rotatably mounted on a pin 51 that is carried by an arm 52. The rim 50*b* of the idler is of flexible material such as rubber or synthetic rubber supported by a center portion 50*c* of a higher durometer test. Due to the flexibility of the rim and the flexible mounting of the motor, the idler can be moved in either direction to any of the steps 49*b*, 49*c*, 49*d* and 49*e* without withdrawing the idler wheel from contact with the shaft and this action is facilitated when the motor is running.

The means for shifting the idler is shown in FIGS. 4, 5 and 6.

A speed shift lever bracket is secured at the right side of the base and extends upwardly from the bottom well 10*c*. It includes a vertical wall 55, a top flange 55*a*, a bottom flange 55*b* and at one end and stepped down from the top flange a narrow idler support flange 55*c*. A speed shift lever, the operating handle 16 of which extends upward through a slot 55*d* in the flange 55*a* has a body 16*a* pivotally secured to the vertical wall 55 at 56. The upper edge of the level is formed with a plurality of V shaped notches any one of which may be engaged by the detent end 57*a* of a spring detent 57 which is secured by an adjustable screw 58 to the underside of the flange 55*a*. The screw extends through a slot 55*e*. Extending from the side of the lever is a bell crank arm 16*b* having an outwardly extending lug 16*c*.

As best shown in FIG. 5, a first idler support arm 60 is pivotally mounted by a vertical rod 61 which extends between the bracket 55*c* and the lower flange 55*b*. The end of the arm 60 is notched at 60*a* and the lug 16*c* extends into the notch. When the lever 16*a* is moved about its pivot by the arm 16, the lug 16*c* raises and lowers the support arm 60. The adjustable detent enables the lever to be placed to the exact position for raising and lowering the idler wheel 50*b* for engagement with any of the top four speed steps on the motor shaft.

The arm 52 is pivotally connected to the support arm 60 and has an angular end which is connected by a spring 62 to a lug 55*f* on the bracket wall, to thus pull the wheel toward the motor shaft and turntable. It is therefore apparent that the speed shifting is accomplished with a very simple mechanism with a minimum number of parts.

Having thus described the invention in an embodiment thereof, I am aware that numerous and extensive departures may be made therefrom without departing from the spirit or scope of the invention as claimed in the appended claims.

I claim:

1. A multiple speed record player having a base and a turntable for rotating a record to played, said turntable having a depending coaxial flange, a drive means for driving the turntable comprising a motor resiliently mounted in the base and having a shaft extending upwardly of the base, said shaft being formed with a plurality of cyclindrical steps of different diameter, idler means interposed between said shaft and the turntable flange comprising a hub of hard material and a radially wide extending rim portion of flexible resilient laterally deformable material, means for supporting said idler means for vertical movement while said rim portion is in engagement with said cylindical steps and said flange, and means for vertically shifting said idler means without disengaging said rim portion from said steps and said flange, the flexibility of said resilient laterally reformable material being such that it bends freely when the idler means is shifted from a small diameter step to a larger diameter step.

2. A device as described in claim 1, wherein said support means includes a bracket secured to the base and having a vertically extending guide parallel to the axis of the turntable and a first support arm having one end swingably and slidably mounted on the guide and a second support arm having one end pivotally connected to the other end of the first support arm and having its other end connected to the idler.

3. A device as described in claim 2, wherein said means for vertically shifting said idler means includes (a) an idler position control lever, a base pivot pivotally mounting said control lever base, said control lever having an arm interlocked with said first support arm and a control arm extending from said base pivot, and means to hold said lever in predetermined positions.

4. A device as described in claim 3, wherein said holding means comprises a detent plate on said lever and slidably adjustable spring pressed means is mounted on the bracket adjacent said lever and engaged with said detent plate to determine the pivotal position thereof.

5. A device as described in claim 4, wherein said cylindrical steps each are of smaller diameter than the other progressively upward from a lower portion of the shaft.

References Cited

UNITED STATES PATENTS

| | | | |
|---|---|---|---|
| 2,262,731 | 11/1941 | Gruber et al. | 274—9.1 |
| 2,518,769 | 8/1950 | Gay | 274—9.1 XR |
| 2,847,862 | 8/1958 | Tatter | 74—190 XR |
| 2,925,737 | 2/1960 | Hartman | 74—190 XR |
| 2,977,124 | 3/1961 | Staar | 274—9.1 |

LEONARD FORMAN, *Primary Examiner.*

JOEL M. FREED, *Assistant Examiner.*